Jan. 21, 1941.  A. F. PFINGSTEN  2,229,520
COMBINATION RADIO AERIAL AND TURN INDICATOR FOR AUTOMOBILES
Filed Jan. 9, 1939
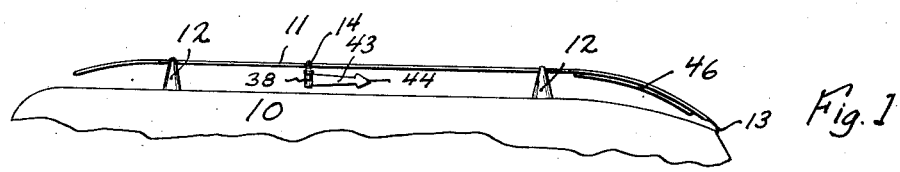
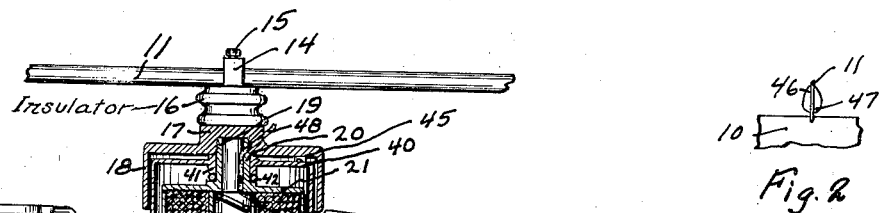
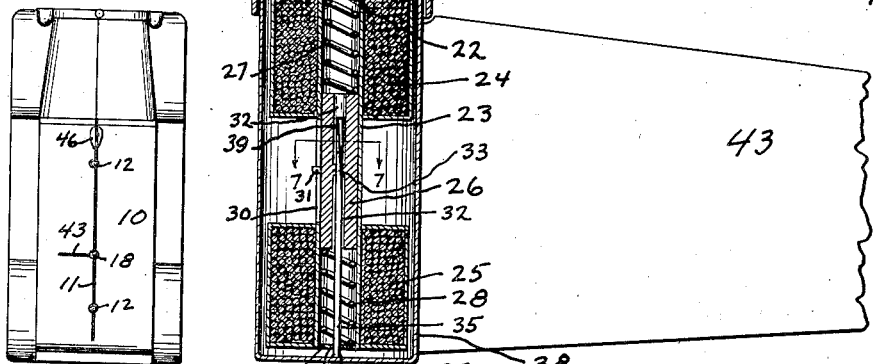
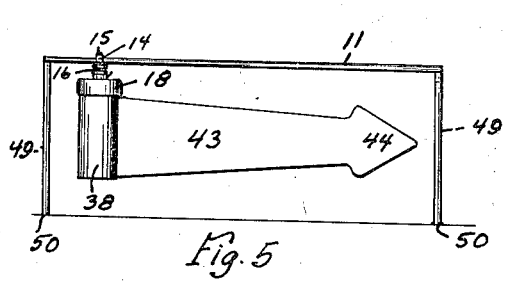
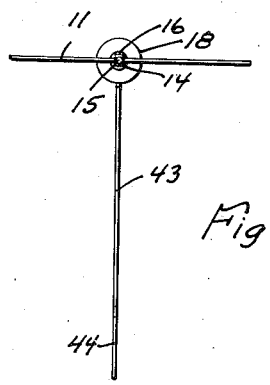
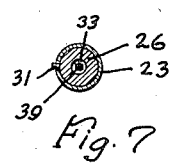
INVENTOR.
August F. Pfingsten
Sam J. Slotsky
BY ATTORNEY.

Patented Jan. 21, 1941

2,229,520

UNITED STATES PATENT OFFICE 2,229,520

COMBINATION RADIO AERIAL AND TURN INDICATOR FOR AUTOMOBILES

August F. Pfingsten, Rock Rapids, Iowa

Application January 9, 1939, Serial No. 249,981

4 Claims. (Cl. 177—327)

My invention pertains to a turn indicator for vehicles.

An object of my invention is to provide a combined turn indicator and aerial which forms a composite unit.

A further object of my invention is to provide a turn indicator which is suspended from the aerial and is so positioned on a vehicle as to be readily visible.

A further object of my invention is to provide a turn indicator which includes electrically controlled elements so arranged to provide such an indicator in a compact and neat size.

A further object of my invention is to provide a turn indicator of this type which can be readily installed as an accessory together with the aerial on a vehicle.

A further object of my invention is to provide a simple turning mechanism and shielding device for the arrangement and to provide a device of this character which is simple to manufacture.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation showing the arrangement attached to an aerial on the top of a vehicle, Figure 2 is a forward view of Figure 1 showing the shield, Figure 3 is a plan view of the vehicle employing my turn indicator arrangement, Figure 4 is an enlarged detailed sectional view, Figure 5 is a further elevation, Figure 6 is a plan view of Figure 5 showing the arrow in one of the turned positions, and Figure 7 is a sectional view taken along the lines 7—7 of Figure 4.

I have used the character 10 to designate the top of an automobile. I have also used the character 11 to indicate a radio aerial of the type which is normally attached to the top of an automobile and which is supported by means of insulating supports 12 located forwardly and rearwardly of the aerial. The aerial connections pass through the vehicle at 13. Attached by means of the clamp 14 and the lock screw 15 to the aerial 11 is the small insulator 16 which is rigidly attached to the raised boss 17 which is an integral continuation of the cap member 18. Securely and threadably engaged at 19 within the boss 17 is a further cylindrical member 20 which terminates in the circular flange 21.

Attached by welding or other suitable means at 22 to the flange 21 is a thin brass tube 23 about which tube are wound the upper and lower electric solenoid coils 24 and 25 respectively. Slidably received within the tube 23 is the iron plunger 26 against which is placed the upper compression spring 27 and the lower compression spring 28 which springs are received within the extremities of the tube 23. The spring 28 rests against the closed portion 29 at the lower end of the tube 23.

The brass tube 23 includes the vertical slot 30 and received within the slot 30 is the pin 31 which is attached to the plunger 26. The plunger 26 includes the cylindrical upper and lower portions 32 which terminate in the center portion 33 and which center portion is square in shape (see Figure 7). Received through an opening 34 in the lower plate 29 is the square lengthened member 35 which is securely attached at 36 to the bottom 37 of the further outer cylindrical member 38. The member 35 extends upwardly and extends into the spirally twisted portion 39 which portion is received within the square portion 33 of the plunger 23.

The hollow cylindrical member 38 is made of thin material and continues upwardly and is attached to a suitable top plate 40 which extends into the portions 41 which are adapted to rest upon a roller bearing structure 42 which structure 42 rests upon the plate 21 as shown. Attached to the cylindrical member 38 is the thin but strong flat arrow shaped member 43 which terminates in the pointed portion 44. The upper portion of the cylindrical member 38 is received within the cap member 18 to provide protection thereto.

A small snap spring arrangement is provided at 45 to maintain the arrow 43 in normal forward position when the same is not in use. A shield member 46 which extends into the wider expanded portion 47 (see Figure 2) is attached to the front end of the aerial to provide means for protecting the arrow and structure thereof against wind currents, snow and the like which would tend to blow against the same during forward movement of the automobile.

The electrical circuit is established to the solenoid by means of suitable wires inclosed in the small cable 48 which can pass along the aerial or can be connected in any suitable manner to the interior of the vehicle to suitable switches which will control either left or right turns of the indicating arrow. Now that the structure of my device has been described, I shall explain the operation thereof.

Assuming that the upper solenoid 24 is connected to the switch for operating the left hand turning of the arrow, when the coil 24 is actuated by means of this switch, the plunger 26 is drawn upwardly into the coil 24. Due to the twisted or spiral formation of the portion 39, the elongated member 35 will be turned to 90° and to the left as shown in Figure 3.

The spiral portion 39 is made of the required length to draw the arrow to the 90° position. Conversely to indicate a right turn the solenoid 35 is actuated by the other switch which draws the plunger 26 downwardly swinging the arrow to the right hand side and by this means the direction of turn can be readily seen either rearwardly, forwardly or at any side of the vehicle due to the position of the same.

The springs 27 and 28 maintain the plunger in neutral position and tend to keep the arrow forward along with the snap spring 45. The pin 31 which rides in the slot 30 prevents the plunger 26 from turning, thereby insuring rotation of the member 35 as described which in turn turns the casing 38 and the arrow since the member 35 is solidly attached at 36 to the casing 38. Through this arrangement, the casing 38 will rotate about the member 20, the portion 41 turning on the bearings 42. The entire structure comprising the member 20, plate 21, the brass tube as well as the plunger will be suspended from the cap member 18 due to engagement within the boss as described, and the only portion supported upon the bearings 42 will be the casing 38, the member 35 and the arrow itself.

It will be noted from the foregoing structure that the entire unit is enclosed so that there can be no entrance of snow, sleet, rain or the like. If desired, instead of an aerial as shown in Figure 5, the horizontal portion which heretofore has been described as the aerial 11 can be bent downwardly into two vertical arms 49 as indicated by Figure 5 and which can be attached at 50 to the top of the vehicle thereby supporting the arrangement although the aerial arrangement is a preferred form.

It will be noted from the above structure that the casing including the electrical units can be made of a small diameter and of a minimum length thereby providing a small and compact unit which weighs relatively very little together with the thin arrow so that an undue amount of energy will not be necessary for swinging the arrow. The arrow can be made of chromium plated steel or similar substance to provide a high reflecting medium.

It will now be seen that I have provided a combined turn indicator and aerial forming a composite unit of the same, that I have provided a turn indicator which is in compact form and which can be operated electrically, that I have provided a turn indicator which can be readily installed as an accessory unit and which is of simple construction.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A combination radio aerial and turn indicator for automobiles comprising an aerial rod attached to the top of said automobile and in a plane parallel to and longitudinally of the automobile, an insulator attached to said aerial rod, an indicating arrow member normally positioned in line with said aerial rod pivotally attached thereto, electrical means for causing said arrow member to turn to left or right position.

2. A combination radio aerial and turn indicator for automobiles comprising an aerial rod attached to the top of said automobile and in a plane parallel to and longitudinally of the automobile, an insulator attached to said aerial rod, an indicating arrow member normally positioned in line with said aerial rod pivotally attached thereto, electrical means for causing said arrow member to turn to left or right position, said means including a pair of vertically spaced solenoids, means operable therebetween for turning said arrow member.

3. A combination radio aerial and turn indicator for automobiles comprising an aerial rod attached to the top of the automobile and in a plane parallel to and longitudinally of the automobile, an insulator attached to said aerial rod, a cap member attached to said insulator, a casing member freely journalled on said cap member, electrical means for turning said casing, an arrow member attached to said casing, said arrow member being normally positioned in line with said aerial rod.

4. A combination radio aerial and turn indicator for automobiles comprising an aerial rod attached at the top of said automobile, and in a plane parallel to and longitudinally of the automobile, an insulator attached to said aerial rod, an arrow indicating member pivoted on said insulator and normally aligned with the said aerial rod, means for actuating said arrow member.

AUGUST F. PFINGSTEN.